(12) United States Patent
McMahon

(10) Patent No.: US 8,072,594 B1
(45) Date of Patent: Dec. 6, 2011

(54) LIQUID LEVEL SENSOR

(75) Inventor: Randel P. McMahon, Oklahoma City, OK (US)

(73) Assignee: Randel P. McMahon, Oklahoma City, OK (US)

(*) Notice: Subject to any disclaimer, the term of this patent is extended or adjusted under 35 U.S.C. 154(b) by 332 days.

(21) Appl. No.: 12/381,542

(22) Filed: Mar. 13, 2009

Related U.S. Application Data

(60) Provisional application No. 61/070,999, filed on Mar. 27, 2008.

(51) Int. Cl.
*G01N 1/10* (2006.01)
*G01N 21/49* (2006.01)
*G01F 23/00* (2006.01)

(52) U.S. Cl. .................. 356/246; 73/293; 250/577

(58) Field of Classification Search .......... None
See application file for complete search history.

(56) References Cited

U.S. PATENT DOCUMENTS

| | | | | |
|---|---|---|---|---|
| 3,995,169 | A | 11/1976 | Oddon | 250/577 |
| 4,039,845 | A * | 8/1977 | Oberhansli et al. | 250/577 |
| 4,354,180 | A | 10/1982 | Harding | 340/619 |
| 4,711,126 | A | 12/1987 | Houpt et al. | 73/293 |
| 4,904,878 | A | 2/1990 | Gipp et al. | 250/577 |
| 4,961,069 | A * | 10/1990 | Tsaprazis | 340/619 |
| 6,872,933 | B2 | 3/2005 | Wirthlin | 250/229 |
| 7,161,165 | B2 | 1/2007 | Wirthlin | 250/577 |

* cited by examiner

*Primary Examiner* — Gregory J Toatley
*Assistant Examiner* — Amanda Merlino
(74) *Attorney, Agent, or Firm* — Phillips Murrah P.C.

(57) ABSTRACT

A liquid level sensor probe for determining liquid level within a vessel, the liquid level sensor probe comprising at least one light source positioned for emitting radiant energy; at least one photosensor positioned for detecting an amount of radiant energy received from at least one light source wherein a change in the amount of radiant energy as detected by at least one photosensor is indicative of a change in liquid level within the vessel; at least one light shield positioned between at least one light source and at least one photosensor wherein at least one light shield prevents radiant energy from directly hitting at least one photosensor; and encapsulation material.

10 Claims, 3 Drawing Sheets

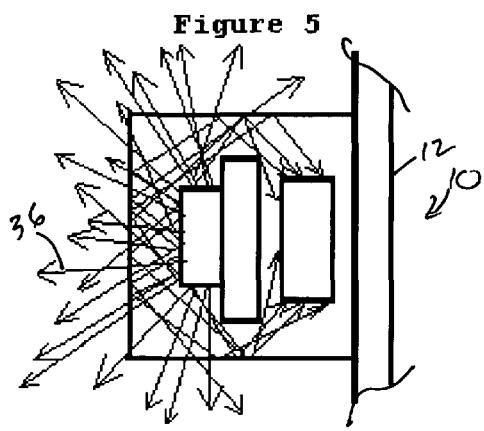
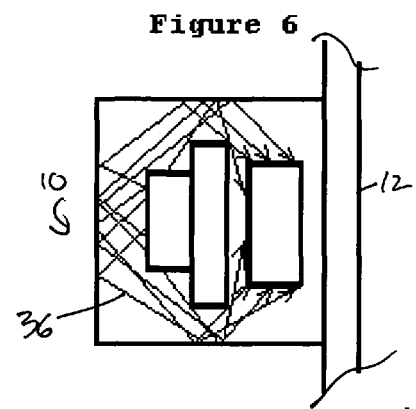
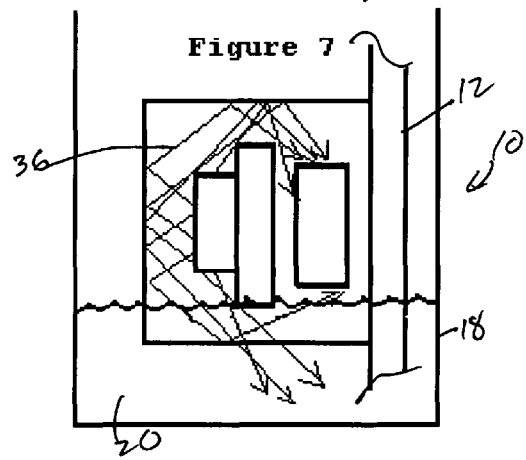
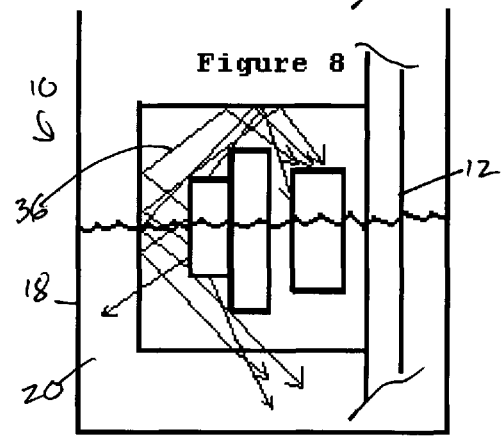
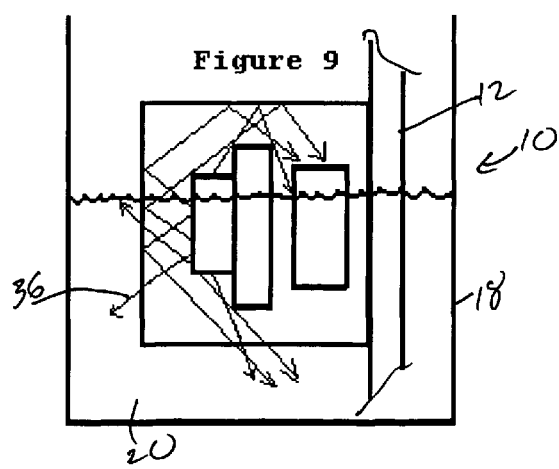
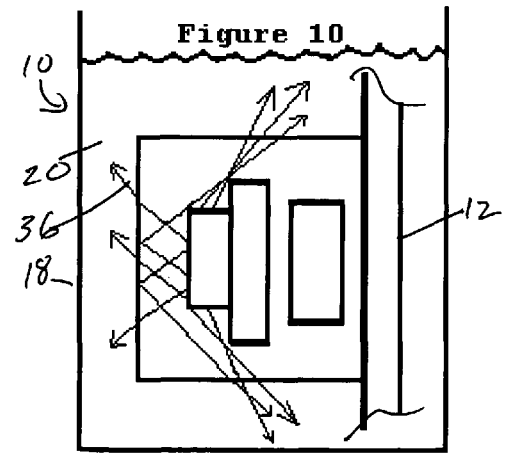

LIQUID LEVEL SENSOR

CROSS-REFERENCE TO RELATED APPLICATIONS

Priority is claimed from provisional patent application U.S. Ser. No. 61/070,999 filed on Mar. 27, 2008 and incorporated by reference herein.

BACKGROUND OF THE INVENTION

1. Field of the Invention

In general, the present invention is an apparatus, system, and method for sensing liquid level in a vessel. More in particular, the present invention generally provides a fully encapsulated liquid level sensor using optical properties for highly accurate monitoring the liquid level in a vessel.

2. Description of the Prior Art

Electrical optical sensing devices are well known in the field of liquid level sensors. They generally employ reflective and refractive optical theory based on the different indices of refraction between two media. Typically, these devices require the liquid to pass between two surfaces wherein the light change is measured as the liquid passes between two locations or through a space.

One such sensor is described in U.S. Pat. No. 4,711,126, which issued to Houpt et al. on Dec. 8, 1987. Houpt teaches a Y-shaped light probe having a single light source at one arm of the Y, and a single light detector at the other. The wall of the probe is coated with a reflective material with windows in the form of thin rings cut out in the reflective material. As the light travels from the light source to the bottom of the sensor, and reflects back to the detector, some of the light is lost through the windows to the outside liquid by refraction. The liquid level is determined by the amount of light that reflects and travels back to the detector.

Another optical liquid level sensor is described in U.S. Pat. No. 3,995,169, issued to Oddon on Nov. 30, 1976. This invention teaches a sensor consisting of a plurality of U-shaped light pipes of various length, each with a light source and a light detector at respective ends of the pipe. The geometry and construction of the pipe is such that the light reflects back to the detector end if liquid is not present at the U bend of the pipe, and refracts out of the pipe if liquid is present.

In U.S. Pat. No. 4,354,180 issued to Harding on Oct. 12, 1982, an electro-optical liquid level sensor is described. Harding teaches a sensor also of probe type configuration, using reflection or refraction of a light beam to determine the liquid level. This sensor detects only at a single level, usually for maximum level or minimum level indication, rather than multi-point liquid level monitoring capability of the present invention.

In U.S. Pat. No. 4,904,878 issued to Gipp, et al. on Feb. 27, 1990, another electro-optical liquid level sensor is described. Gipp, et al. also provides a sensor, which requires the liquid to pass between a first housing portion that is spaced from the second housing portion wherein liquid may pass through.

All these prior art devices have the disadvantage of requiring the light to bounce or be received across a space wherein the space must have the liquid pass through. This obviously creates a region that can be blocked by contaminants and impurities in the liquid thereby making the measurements inaccurate when the amount of light returning to the detector is not true to the level of liquid to be measured. Each of the above identified electrical optical liquid level sensors and others in the field are adequate in certain situations, but may create difficulties due to the nature of the device and the need for two surfaces, areas, and/or sensors for the liquid to pass.

In the U.S. Pat. No. 7,161,165 issued to Wirthlin on Jan. 9, 2007, an optical transducer for liquid level determination is described that does not require the liquid to pass through two points. Radiant energy from the light source is projected into a probe until it hits a reflective element, whereupon it is reflected back towards a photo sensor. The obvious disadvantage is the required addition of a reflective element and the cost accordingly to provide such configuration as well as the problems associated with using large vessels and the distance of reflections accordingly.

In view of the above, there is currently a need for a device that is more reliable, better construction and that eliminates the need for the liquid to pass between sensors. Currently in the prior art, there is no device or system which is sufficiently sensitive, inexpensive, and robust enough for common daily usage and especially in volatile environments or where extremely accurate readings are desired.

The above discussion is not to be considered exhaustive, however, does demonstrate that a need exists for a more accurate and reliable means to detect liquid levels in vessels. The industry is looking for solutions, methods, and systems to address these needs and there is an obvious need to fill the gap where the prior art has failed. What is needed is an apparatus, system and method to address these shortcomings in the prior art while also addressing the significance of the issues presented.

SUMMARY OF THE INVENTION

In view of the foregoing disadvantages inherent in the known types of methods and technologies associated with optical liquid level sensors now present in the prior art, the current invention provides a new and improved apparatus, system and method of using the same where the prior art fails. As such, the general purpose of the present invention, which will be described subsequently in greater detail, is to provide a new and improved liquid level sensor which has all the advantages of the prior art and none of the disadvantages.

To attain this, the current invention may include an apparatus, system and method for liquid level measuring and sensing that may be located in vessels of numerous configurations and size wherein a liquid level sensor may be located. The liquid level sensor may include a probe having an opaque light shield positioned between a light emitting element and a light sensing element wherein all are fully encapsulated. It is contemplated to provide a method of measuring liquid level that comprises continuously sensing liquid level with a light sensing element and generating an output signal based on the sensed liquid level by measuring an amount of radiant energy exiting the probe. A change in the amount of radiant energy as detected by the light sensor is indicative of a change in liquid level within the vessel.

It is contemplated that no or little signal is created when the probe is covered by the liquid in the vessel generally indicating the vessel is full. Essentially, the light emanated from the light sources is dispersed away from the light sensing element when the probe is immersed in the liquid.

It is also contemplated that a signal will be at its strongest when the probe is not covered by liquid in the vessel generally indicating the vessel is empty. Essentially, the light emanated from the light source is allowed to reflect back to the light sensor when the probe is not covered in liquid.

It is further contemplated that a measurement between empty and full can be calculated to a very high degree by measuring the difference between the full and empty signal in a proportional manner of fullness of liquid in the vessel to the amount of signal detected.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction, arrangement of the components, systems, ranges and amounts thereof set forth in the following description. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception upon which this disclosure is based may readily be utilized as a basis for the designing of other apparatus, compositions, methods, and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new and improved liquid level sensor apparatus, system, and method that may be easily and effectively be used to provide reliable and highly accurate measurements and resolution of liquid in a vessel.

It is a further object of the present invention to provide a new and improved liquid level sensor apparatus, system, and method that provides a high speed measurements with no moving parts.

An even further object of the present invention is to provide a new and improved liquid level sensor apparatus, system, and method that is susceptible to a low cost of manufacture and implementation, and, thus accordingly, is then susceptible to low prices of sale or use to the consuming industry thereby making such economically available.

Still another object of the present invention is to provide a new and improved liquid level sensor apparatus, system, and method which provides all of the advantages of the prior art, while simultaneously overcoming some of the disadvantages normally associated therewith.

Another object of the present invention is to provide a new and improved liquid level sensor apparatus, system, and method that may utilize a generally rugged and robust construction, which may provide for use in harsh environments and numerous applications and locations.

Yet another object of the present invention is to provide a new and improved liquid level sensor apparatus, system, and method that allow for infinite measurement increments in non-uniform vessels and uniform vessels.

An even further object of the present invention is to provide a new and improved liquid level sensor apparatus, system, and method that combine proven technologies and may allow for integration with carburetors, fuel systems, and so forth where accurate and reliable measurements are desired.

Still another object of the present invention is to provide a new and improved liquid level sensor apparatus, system, and method that provides a fully encapsulated device that does not require the liquid to be measured to pass through the apparatus in any means.

Another object of the present invention is to provide a new and improved liquid level sensor apparatus, system, and method that may provide a safe method for measuring volatile liquids in harsh environments.

These, together with other objects of the invention, along with the various features of novelty that characterize the invention, are pointed out with particularity in the claims annexed to and forming a part of this disclosure. For a better understanding of the invention, its operating advantages, and the specific objects attained by its uses, reference should be had to the accompanying descriptive matter in which there are illustrated preferred embodiments of the invention.

BRIEF DESCRIPTION OF THE PICTORIAL ILLUSTRATIONS GRAPHS, DRAWINGS, AND APPENDICES

The invention will be better understood and objects other than those set forth above will become apparent when consideration is given to the following detailed description thereof. Such description makes reference to the annexed pictorial illustrations, graphs, drawings, drawings, and appendices.

FIG. 5 is generally an illustration of the transmitted and reflected light output constructed in accordance with a preferred embodiment of the invention.

FIG. 6 is generally an illustration of the reflected light only constructed in accordance with a preferred embodiment of the invention.

FIGS. 7, 8, 9 and 10 generally illustrate how the reflected light responds to liquid levels constructed in accordance with a preferred embodiment of the invention.

Figure 11:
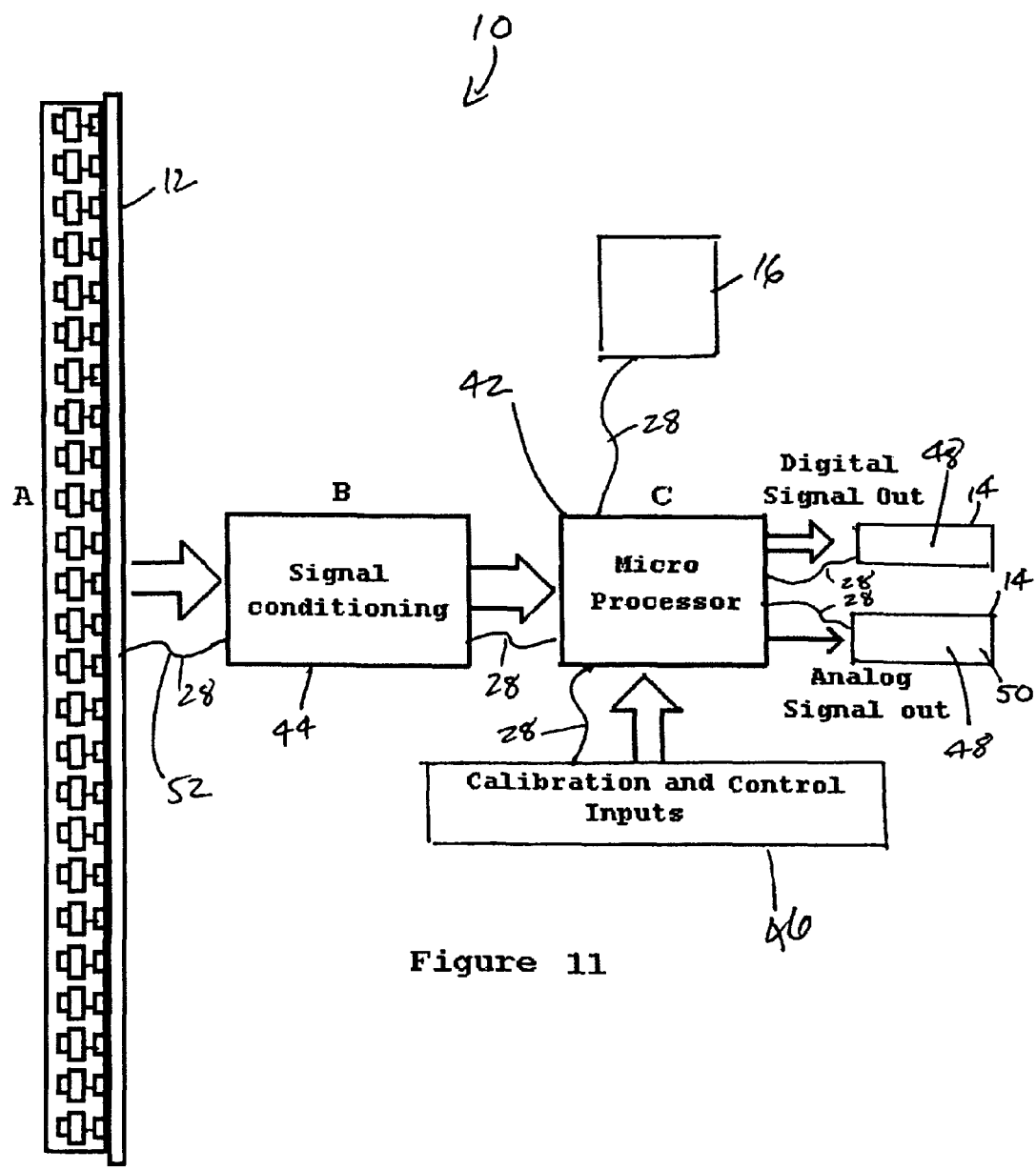

FIG. 11 generally illustrates a typical associated electronic interface for the sensor constructed in accordance with a preferred embodiment of the invention.

DETAILED DESCRIPTION

In a preferred embodiment, the invention 10 generally comprises a fully encapsulated liquid level sensor using optical properties for highly accurate monitoring the liquid level in a vessel apparatus, system, and method. In a preferred construction, invention 10 may include a sensor unit or probe 12, a receiver unit, display, or gauge 14 either analog or digital, and a power source 16 for use with a vessel 18 that may contain liquid 20

Figure 1:
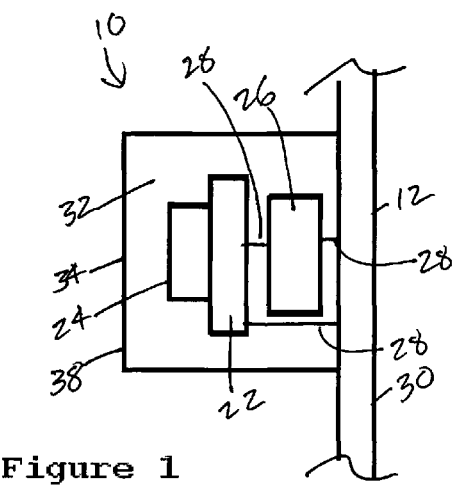
FIG. 1 is generally a side view of an individual sensor element constructed in accordance with a preferred embodiment of the invention.

Referring to the illustrations and FIG. 1 in particular, it is contemplated that probe 12 may include an opaque light shield or shield 22 positioned between a light emitting element or emitter 24 and a light sensing element, photosensor or light sensor 26. Electrical connectors 28 may connect the aforementioned to an interconnection substrate or substrate 30. It is contemplated that substrate 30 may be a printed circuit board or other electrical connection method. Electrical connectors 28 are further discussed below along with interconnection to power source 16 (not shown) and gauge 14 (not shown). Probe 12 may include encapsulation material 32 which may encapsulate probe 12 as well as fill in any spaces between probe 12 elements. It is understood that more than light emitting element or emitter 24 may be utilized and that the light may be but is not limited to an LED type light.

It is contemplated that encapsulation material 32 may be generally transparent or translucent and provide a transition surface 34 which will also be further discussed below. Encapsulation material 32 may also be shaped as generally depicted in the illustrations, although such illustrations should not be considered to limit the scope of contemplated shapes. It is further contemplated that any other shape may be utilized such as but not limited to generally round, triangular, rectangular, elliptical, polygons and so forth.

Encapsulation material 32 may be but is not limited to acrylics, nylon, polyetherimide, polysulfone, polyurethane, polycarbonate, polypropylene, polyvinyl chloride (PVC), silicon, glass material such as borosilicate or quartz, plastics, and so forth. It will be understood that the term "transparent" as used herein refers to a material condition that ranges from optically clear to opaque for various wavelengths of radiant energy. By way of example, some materials that allow transmission of a substantial amount of radiant energy in the visible light region of the electromagnetic spectrum may not allow significant transmission of radiant energy in the infrared or other regions.

Figure 2:
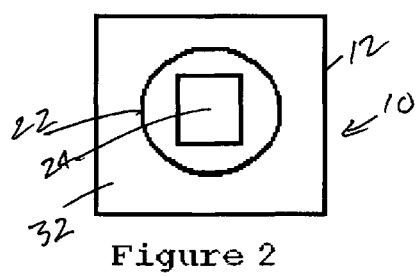
FIG. 2 is generally a front view of an individual sensor element constructed in accordance with a preferred embodiment of the invention.

Once again referring to the illustrations and FIG. 2 in particular, it is contemplated that light shield 22 may extend beyond the boundaries of light emitting element 24 and both are surrounded by encapsulation material 32. It is also understood that the shaped depicted should not be considered to limit invention 10 as such and numerous configurations and shapes are contemplated.

Figure 3:
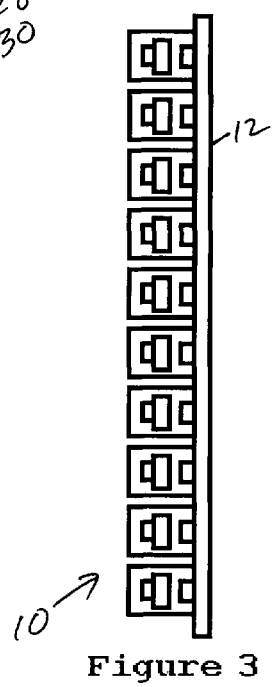
FIG. 3 is generally a side view of an element sensor with individual encapsulation constructed in accordance with a preferred embodiment of the invention.
Figure 4:
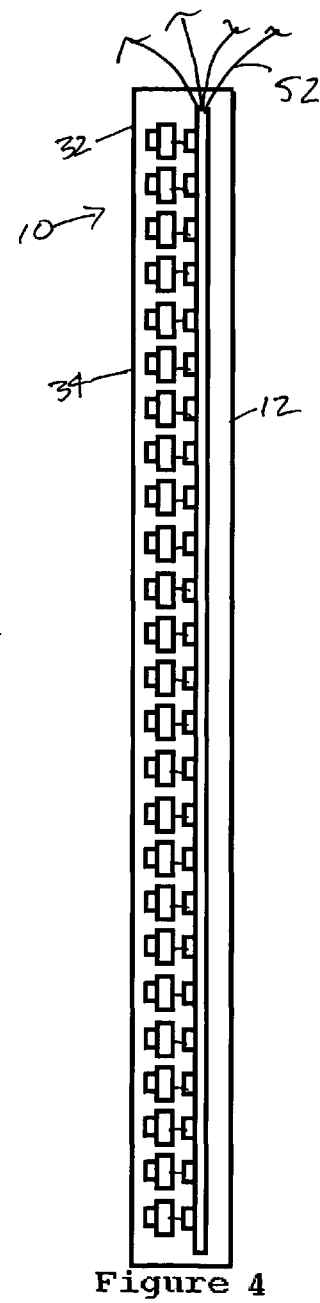
FIG. 4 is generally a side view of an element, fully encapsulated sensor constructed in accordance with a preferred embodiment of the invention.

Once again referring to the illustrations and FIGS. 3 and 4 in particular, it is further understood that more than one light emitter 24 may be utilized. As generally depicted, multiple light emitting elements 24 may be utilized and accordingly multiple light sensors 26 with respective amount of light shields 22 between, encapsulation material 32, and so forth. It is contemplated that the length of probe 12 is generally corresponding to the depth of vessel 18 (not shown) and numerous configurations may be utilized for such.

In accordance with a preferred embodiment of the invention, multiple emitting elements 24 may be constructed in linear rows, columns, row and column arrays, circular or other arrangements to fit various applications, and with any number of corresponding and or individual light sensor element 26 and so forth. It is also contemplated to utilize multiple probes 12 in various configurations of vessel 18.

Referring to the illustrations and FIGS. 5 through 10 in particular, it is contemplated the current invention utilizes characteristics of light transmission across a transition between materials with different refraction, reflection, and/or absorption characteristics, further referred to as characteristics. It is contemplated the invention may be utilized in numerous liquids and the following should not be considered to limit the invention as such to uses measuring only water. Furthermore, it is contemplated the invention may be utilized in vessels with numerous gases and the following should not be considered to limit the application to vessels with just air.

FIG. 5 generally illustrates probe 12, with light emissions 36 generally depicted as arrows in random directions from the light emitter 24. The opaque, light shield 22 generally prevents any direct radiation or light emissions 36 from reaching light sensor 26.

By means of general explanation, consider the sensor unit or probe 12 shown generally in FIG. 5 as being surrounded by air, which offers substantially different characteristics to light than does the encapsulation material 32. The outer surface 38 of the encapsulation material 32 may be referred to as transition surface 34. As generally illustrated, the majority of the light emission 36 will pass through the transition surface 34 from the encapsulation material 32 to the surrounding air, but due to the differences in characteristics of encapsulation material 32 and the air, the transition surface 34 will offer a degree of reflective characteristics and a substantial portion of the emitted light 36 will be reflected by the transition surface 34 eventually reaching the light sensor element 26.

FIG. 6 generally illustrates only that portion of emitted light 36 that is reflected within the encapsulation material 32 and reaches the light sensor 26. Emitted light 36 generally alters the electrical state of the light sensor 26 in a manner proportional to the amount of light reaching it. Therefore, a measurement of the electrical state of the light sensor 26 provides an electrical signal that is proportional to the amount of light reaching the light sensor 26. When a substance other than air comes in contact with the transition surface 34, the characteristics of transition surface 34 are altered accordingly. By means of example, with liquid 20 (not shown) such as water, the characteristics of the encapsulation material 32 and the water are much more similar than that of the air and the encapsulation material 32. These similarities effectively result in the practical elimination of the effects of the transition surface 34, dramatically reducing the reflective characteristics previously exhibited by the transition from encapsulation material 32 to air.

Referring generally to the illustrations and FIG. 7 in particular, liquid 20 is in contact with transition surface 34 and it is now easier for the previously reflected light emission 36 to pass through the transition surface 34, reducing the amount of light emission 36 reaching or reflected to light sensor 26. The electrical signal produced by light sensor 26 is thereby proportionally reduced.

As further generally illustrated in FIGS. 8, 9 and 10, the rising liquid 20 level proportionally reduces the amount of light emission 36 reaching light sensor 26, resulting in an electrical signal proportional to the level of the liquid 20 in contact with probe 12. It is contemplated that the longer probe 12 may be within the fully encapsulated material 32 as generally depicted in FIG. 4, a more linearized light sensor 26 output may occur due to the spreading of the emitted light 36 to adjacent light sensors 26. Additionally, the continuous encapsulation reduces the effects of "wicking", thereby improving the resolution of the measurement between elements.

It is contemplated invention 10 may be used to measure liquid 20 levels in vessels 18 wherein liquid 20 may generally be clear such as water, gasoline, and so forth. It is further contemplated to utilize invention 10 with other clear, transparent or translucent liquids with similar characteristics.

Invention 10 may be utilized and configured to operate with opaque liquids of various colors and characteristics. It is still further contemplated invention 10 may be utilized with opaque, white liquid such as milk, where it is understood that a generally different or opposite effect on the characteristics of transition surface 34 may occur. It is contemplated that instead of reducing the reflective component of the transition surface 34, the white, opaque liquid, will reflect light emission 36, which was previously passing through the transition surface 34, thereby, increasing the amount of light emissions 36 reaching the light sensor 26. For applications with liquids of other colors, probe 12 can be constructed with light emitters 24 of colors more suited to the application, providing enhanced or reduced reflection according to the desired response.

It is contemplated that vessel 18 may generally be sealed and constructed in such a manner that light does not seep in or minimally seeps inside vessel 18 so that miscellaneous light does not interfere with the measurements therein. It is contemplated that vessel 18 may not be sealed or configured as such, but located in a manner wherein light does not seep or minimally seeps into the vessel. It is contemplated that invention 10 may be utilized in carburetors and vessel 18 may be a gas and or fuel bowl wherein light may be shielded with a shroud over the same or the vessel is generally in a dark place.

It is contemplated to further provide an apparatus, system, and or method for dynamically measuring a volume of liquid 20 in vessel 18, comprising probe 12 generally mounted on vessel 18, light sensor 26 configured to produce an electrical indication when a predetermined volume of liquid 20 remains in vessel 18, a rewritable memory for storing a look-up table, wherein the look-up table stores correspondences between volumes of liquid 20 in the vessel 18 and levels of liquid 20 in vessel 18.

Furthermore, probe 12 may generally have controller 42 configured to receive outputs from said probe 12 and the sensor 26 and convert the output from the probe 12 sensor 26 into liquid 20 volume by utilizing a look-up table, wherein when controller 42 detects the electrical indication from the sensor 26, the controller 42 calculates a current level of liquid 20 from the output from the sensor 26 and calculates a current volume of liquid 20 in vessel 18 by decrementing/incrementing a previous volume of liquid 20 by the predetermined volume of liquid 20, and controller 42 rewrites the look-up table with the calculated current volume of liquid 20 corresponding to the current level of liquid 20.

FIG. 11 generally illustrates a block diagram of a preferred embodiment of the associated circuitry and system thereof for converting the electrical signals from probe 12 sensor 26 into digital or analog signals with calibrated proportions. Controller 42 may generally be a microprocessor know in the art and utilize a signal conditioning unit 44 and calibration and control inputs 46.

The signal conditioning unit 44 may contain probe 12 control and temperature compensation circuitry. It is contemplated that as probe 12 is powered up, heat produced from probe 12 may alter readings and the signal conditioning unit 44 may be utilized to allow correct compensation for same for accurate level indications. Controller 42 may apply calibrations and develop an output proportional to liquid 20 level (not shown) being measured as well as provide a means for look-up tables and the associated processing to allow digital signal 48 to be displayed and or an analog signal 50 to display liquid 20 level (not shown) in vessel 18 (not shown).

It is contemplated that a preferred embodiment would have electrical connectors 52 from probe 12 to controller 42 wherein controller 42 may provide power to probe 12 and other elements. Power may be a battery, car battery or other power sources known in the art. It is contemplated that electrical connectors 52 may utilize four wires wherein to generally provide power and a return to probe 12 light emitters 24 and to provide power and return for light sensor 26.

It is therefore contemplated to provide a liquid level sensor probe 12 for determining liquid 20 level within vessel 18 comprising at least one light source or light emitting element 24 positioned for emitting radiant energy or light emission 36; at least one photosensor or light sensor 26 positioned for detecting an amount of said radiant energy or light emission 36 received from at least one said light source or light emitting element 24 wherein a change in the amount said radiant energy or light emission 36 as detected by at least one said photosensor or light sensor 26 is indicative of a change in said liquid 20 level within said vessel 18; at least one light shield 22 positioned between at least one said light source or light emitting element 24 and at least one said photosensor or light sensor 26 wherein at least one said light shield 22 prevents said radiant energy or light emission 36 from directly hitting at least one said photosensor or light sensor 26; and encapsulation material 32 for encapsulating at least one said light sources or light emitting element 24, at least one said photosensor or light sensor 26, and at least one said light shield 22 wherein said encapsulation material 32 provides transition surface 34 which allows said radiant energy or light emission 36 to proportionally refract back to at least one said photosensor or light sensor 26 from at least one said light source or light emitting element 24 around at least one said light shield 22 when liquid 20 covers said transition surface 34 and wherein said radiant energy or light emission 36 proportionally does not refract back to at least one said photosensor or light sensor 26 from at least one said light source or light emitting element 24 around at least one said light shield when said liquid 20 covers said transition surface 34.

A number of implementations have been described herein. Nevertheless, it will be understood that various modifications may be made. Accordingly, other implementations are within the scope of the following claims. Changes may be made in the combinations, operations, and arrangements of the various parts, elements, and amounts described herein without departing from the spirit and scope of the invention.

I claim:

1. A liquid level sensor probe for determining liquid level along a spectrum within a vessel, the liquid level sensor probe comprising:
   a plurality of light sources positioned along a length for emitting radiant energy along said length and said spectrum is defined by said length;
   a plurality of photosensors positioned for detecting an amount of said radiant energy received from said plurality of light sources wherein a change in the amount of said radiant energy as detected by said plurality of photosensors is indicative of a change in said liquid level within said vessel along said spectrum;
   a plurality of light shields positioned between said plurality of light sources and a plurality of photosensors wherein said plurality of light shields prevents said radiant energy from directly hitting said plurality of photosensors; and
   encapsulation material for encapsulating said plurality of light sources, said plurality of photosensors, and said plurality of light shields wherein said encapsulation material provides a transition surface which allows said radiant energy to proportionally refract back to said plurality of photosensors from said plurality of light sources around said plurality of light shields when liquid does not cover said transition surface and wherein said radiant energy proportionally does not refract back to said plurality of photosensors from said plurality of light sources around said plurality of light shields when said liquid covers said transition surface.

2. The liquid level sensor probe of claim 1 wherein said encapsulation material is a clear acrylic.

3. The liquid level sensor probe of claim 2 wherein said plurality of light sources is an LED light are LED lights.

4. The liquid level sensor probe of claim 3 wherein said vessel is a carburetor fuel bowl.

5. The liquid level sensor probe of claim 4 wherein said fluid is a fuel.

6. The liquid level sensor probe of claim 5 wherein said vessel is closed.

7. The liquid level sensor probe of claim 6 wherein said vessel is not exposed to any other light other than at least one said light source positioned for emitting radiant energy.

8. The liquid level sensor probe of claim 7 further including a gauge for visual representation of said liquid level as indicated by said liquid level sensor probe.

9. The liquid level sensor probe of claim 8 wherein said gauge is analog.

10. The liquid level sensor probe of claim 8 wherein said gauge is digital.

* * * * *